United States Patent [19]

Fontaine

[11] 4,145,143

[45] Mar. 20, 1979

[54] METHOD OF CONTROLLING THE PROPERTIES OF A MIXTURE

[76] Inventor: Albert M. Fontaine, 89, Mont, Comblain-au-Pont, Belgium

[21] Appl. No.: 811,043

[22] Filed: Jun. 29, 1977

[30] Foreign Application Priority Data

Jul. 1, 1976 [LU] Luxembourg ............................ 75276

[51] Int. Cl.² ................................................ B28C 7/14
[52] U.S. Cl. ...................................... 366/40; 366/313
[58] Field of Search ................. 366/16, 17, 19, 27–29, 366/40, 151, 153, 132, 313, 314

[56] References Cited

U.S. PATENT DOCUMENTS

| Re. 27,681 | 6/1973 | Gaddis | 366/153 |
| 1,737,609 | 12/1929 | Nielsen | 366/153 |
| 3,678,984 | 7/1972 | Stehning | 366/313 |
| 3,877,682 | 4/1975 | Moss | 366/132 |

Primary Examiner—Leonard D. Christian
Attorney, Agent, or Firm—Holman & Stern

[57] ABSTRACT

A method for controlling the properties of a mixture of materials to which are added a liquid and at least one additive causing expansion during production by mixing, wherein the speed and the absolute value of the volumetric changes undergone by the mixture during the mixing operation are measured in continuous or intermittent manner, and the addition of said liquid and said at least one additive to said mixture is controlled as a function of these measurements and of previously established predetermined data.

13 Claims, 1 Drawing Figure

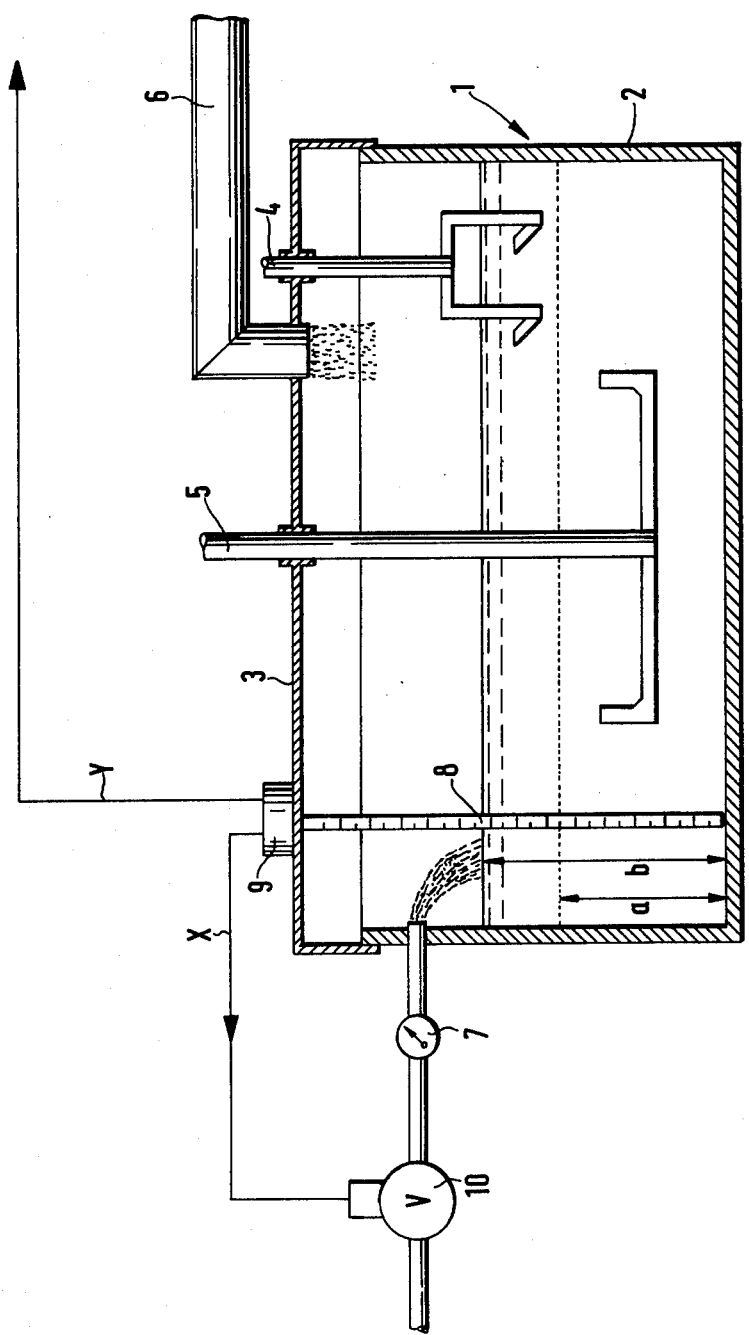

METHOD OF CONTROLLING THE PROPERTIES OF A MIXTURE

The present invention relates to a method of controlling the properties of a mixture undergoing volume changes by admixture of additives on the occasion of its preparation. In particular it relates to a method of controlling the production of foundry sands as well as to a device for its application.

Different mixtures of sands and refractory substances are commonly applied at present to form a mould which serves the purpose of casting a metal. On the score of uniform quality of the pieces cast, particular chemical and physical properties required from these mixtures cannot vary except within quite specific limits. In generalised manner, the production of the mixtures is performed in mixers or on the basis of a foundry sand to which are added in particular water and other materials such as clay, carbon, cereals, etc. The mixture thus prepared in the mixer should comply with a particular number of criteria and features characteristic of the kind of pieces cast and of the metal which is to be cast, these criteria being, in particular, the proportion of water, the proportion of additives such as carbon, clay etc., the mechanical strength, fluidity, permeability, etc. These criteria and features have commonly been determined on the basis of tests and experiments over a long period. For example, a foundry sand mixture is applied at present in steel works which, apart from silica, contains approximately 9% of clay, approximately 1% of cereals and a water content of 3% to 3.6% and which, after grinding, has a mechanical strength under compression of the order to 1300 g/cm$^2$.

As a basal sand forming part of the mixture, use is very frequently made of recovered sand, that is a mixture of foundry sand already used beforehand and whereof the precise initial characteristics are unknown or cannot be determined. It is of prime importance however that, for the casting of foundry pieces of the same kind, the foundry sand mixture always has the same criteria and characteristics. Consequently, it is of great importance to be able to verify the production of the mixture so that it remains constant and homogeneous for every fresh batch.

On the score of economy, the proportion of recovered sand which forms part of the mixture commonly substantially exceeds that of the fresh sand. For the same reasons, the mechanization of the production of sand moulds is very widespread at present; this mechanization has the result, however, that the demands made on the quality of the sand, in particular its quality prior to compression, are much greater and that the factors affecting this quality may vary only within satisfactorily specified tolerance limits. Consequently, it becomes increasingly important that the factors determining the quality of the sand such as, for example, the compressive strength, the shear strength, the "Shetter" index, the compactibility index, and the density indices, remain substantially the same. One of the primary conditions the moulder sets in respect of the uniform quality of the moulding sand is that its moulding density always remains within such limits that a constant compression density may be obtained with a uniform volume reduction on compression.

For assessment of the properties of foundry sands and for keeping these constant during their production in the mixer, reliance was primarily placed in the past on the operative, who judged their qualities during production as a function of the visual or sensory appearance of the mixture. It is obvious that a check of this nature is too dependent on human failures and weaknesses and cannot be satisfactory in any event during the production on a large scale of such mixtures.

Some devices have already been applied in the past for determining one property or another of a mixture of foundry sand. The determination of the proportion of water as well as the mechanical strength are thus verified periodically in a laboratory on samples taken from the mixture. The implementation of this verification during the production of the mixture proved, however, to be impracticable. In view of this fact, devices have been developed which afford a particular verification during the production of the sand mixture; by way of example, there is known a device referred to as "Speedy bomb" which determines the production of water; a device referred to as "mouldability tester" which determines the fluidity of the sand mixture; devices determining the resistivity of the sand mixture, e.g. making, use of the measurement of the variations of intensity of an electric current, for determining the proportion of water from the same.

A device is also known which determines the plasticity of a foundry sand mixture by measuring the increase in height of the mixture during its processing in a mixer and by controlling the infeed of water to the mixture as a function of the height measured.

The principle disadvantage of these control devices resides in the fact that they are all primarily based on the proportion of water of the mixture and do not allow sufficiently for the other factors determining the quality of the mixture. On the other hand, they are slow in operation and, by virtue of this fact, impede the production of the mixture. The precision of the mensuration results obtained by these devices is commonly no longer adequate to assure the qualities required at present for these mixtures, in particular for the mixtures of sand for foundries specialising in the casting of special allows.

The present invention consequently, has as its object the provision of a method which affords direct and permanent verification of the particular quality of a mixture, in particular of a foundry sand mixture, and thereby the controlling of the features of the mixture during its production so that an identical homogenous and constant composition is always reached despite any differences in raw materials and ambient conditions.

The invention is based on the essentially known phenomenon that during the production of a mixture containing fermentable products or additives causing a swelling action together with a particular quantity of liquid, an increase in volume of this mixture may be observed during its mixing. It has now been observed that both the absolute value as well as the speed of increase or decrease of the volume of a mixture of this kind are in direct relationship with its particular desirable properties, which depends on the quantity and on the nature of the additives and liquids added to the mixture during its production.

The method in accordance with the invention consequently consists in measuring in permanent manner during the production of a mixture, and more specifically during the mixing of the mixture, the volumetric changes of the mixture as well as the speed at which these changes take place, and in controlling, as a function of these measurements and of previously established data, the addition of the liquid and of the additives to the said mixture, with respect to their nature as well as to their quantities.

According to a form of embodiment of the invention, the relationships between the factors affecting the quality of the mixture and the additives, as well as between these factors and the liquid, obtained beforehand by tests and calculations, are pre-recorded; the control of the addition of the liquid and of the additives to the mixture during its mixing operation is performed by making use of the data measured during the mixing operation and of those recorded beforehand. The exploitation of these data may be performed in accordance with a specific logistical programming.

Further features and advantages of the inventive method as well as of the devices for its application, will be apparent from the following description of a particular form of embodiment, with reference to the accompanying drawing in which:

The FIGURE is a diagrammatical view, partly in section, of the mixer comprising the invention.

In the FIGURE, the mixer 1 comprises a vat 2 and a cover 3. Mixing elements in the form of a high-speed stirrer 5 and a "waltzer" 4 equipped with blades, are installed in the mixer and revolve around their axes to cause the mixing of the materials present in the vat 2. These materials are fed into the mixer 1 via a pipe 6 which passes through the cover 3 of the mixer. The infeed of the materials which are to be mixed may equally be performed in a different manner, for example via an opening made in the cover 3 of the mixer 1. The infeed of the liquid, in particular of water, required for mixing and for the production of a pasty mixture, occurs via the pipe 7.

The operation of the above described mixer will be described with reference to an example of a foundry sand which should correspond to the following characteristics after preparation and mixing:

compressive strength: 1400 g/cm$^2$
water content: 3%
bentonite content: 9%
carbon content: 1.5%

Foundry sand already used previously, referred to as return sand, whereof the precise composition is unknown, is used as a raw basic material for the production of this sand. This return sand is weighed or metered volumetrically in reproducible manner and fed into the mixer 1 up to a particular level, for example up to the level denoted by "a" in the FIGURE. Subsequently, the additives and the water are fed into the mixer in proportions approaching the final composition of the mixture. The mixing action is then started up for 3 to 4 minutes, for example. The mixing operation is performed, as illustrated by the rotation of the mixing elements 4 and 5. There are mixers, however, which may be used in which the arms are stationary and the vat 2 is rotary.

The mixture expands, that is to say increases in volume, during the mixing action. The height of the mixture level in the vat 2 will consequently increase progressively at a particular speed, and since the base of the vat 2 is constant and known, the change in level is a direct measure of the change in mixture volume. It is well known, on the other hand, that the density of an expansible mixture is in direct relationship with its volume. A test for checking the particular quality of a foundry sand mixture is already known which consists in measuring the specific or apparent gravity of the prepared sand. This test has the feature of making allowance for all the criteria of importance, such as the temperature of the sand mixture, its water content, its proportion of fine particles, its proportion of bentonite. Consequently, this test yields a satisfactory synthesis of important characteristics of a foundry sand; conversely, starting from given or required features, it renders it possible to establish a direct relationship between the speed and the degree of expansion or the speed and the degree of volumetric increase and the quality required or asked for a particular foundry sand mixture. The degree of volumetric increase is thus a direct measurement for the specific gravity which, for its part, is a direct indication of the quality and homogeneity of the prepared sand.

In the example cited in the foregoing, it was observed that the prepared sand is most satisfactory for its processing in a moulding machine if it issues from the mixer with a specific gravity lying between 0.75 and 0.85.

Considering the data given in the foregoing, the mixing device in accordance with the present invention is equipped with a device 8 for measuring the mixture level. This device may, for example, take the form of a mechanical, electrical or radiation probe. Rods, feelers, floats, etc., are known by way of example as mechanical probes. Contact probes, capacitative probes, etc., are known electrical or electronic probes. Amongst the radiation probes, sonic or electromagnetic or luminous probes, X-ray probes, infrared probes, and isotopic ray probes are known.

In the example shown in the FIGURE, the addition of liquid and/or additives is performed in continuous or intermittent manner and is checked during the mixing operation, until the mixture has reached the level "b" shown in the FIGURE. As soon as this level is reached, the required volume and specific gravity are reached, the probe 8 transmits a signal after a particular vertification period to an electric control device 9, which via a circuit denoted diagrammatically by X, controls a motorised valve 10 installed in the liquid feed pipe 7, and, if applicable, controls via a circuit denoted diagrammatically by Y a device (not shown in the FIGURE) for controlling the supply of the additives; the said signal immediately causes the interruption of the supply of liquid and/or of additives, or else the infeed of a quantity "z" equivalent to the expansion of the sand in accordance with the level "b" which is to be reached, and the measurement taken.

As soon as the sand mixture "a" has reached the level "b" in the vat 2, it therefore corresponds to the qualities required. The mixing operation is stopped and the prepared sand may be withdrawn from the mixer 2 for conveying to the moulding machine.

According to a modified form, the aforesaid method may advantageously be performed in several stages. The addition of a particular quantity of liquid is thus performed during the mixing action in a first stage; the measurement of the speed of expansion and the absolute value of this expansion caused by the addition of the liquid is used to determine the nature and the quantities of the additives which are thereupon added to the mixture in a second stage. In the following stage or stages, a similar procedure is followed to reach the final result required by commonly decreasing stages or steps.

A very uncomplicated checking and control method which renders it possible, in effective manner, to obtain a foundry sand whereof the qualities always remain substantially identical, has thus been described in the foregoing. This process may be optimised however by measuring, in continuous manner, the level of mixture in the mixing vat and by controlling the supply of water and/or additives or even raw materials as a function of this continuous measurement. The measurement of the level could moreover be complemented by a measurement of the water flow rate, by a weighing operation on the raw materials and the additives. The method could thereupon be automatised by feeding all these data into a control device which will control the rates of flow of water and additives to reach a desirable final quality of the sand mixture.

Although the invention has been described with reference to foundry sands, it is applicable with identical or analogous advantages to other mixtures undergoing changes in volume during production, such as for example, concrete or bakery and confectionary doughs.

I claim:

1. A method for controlling the properties of a mixture of a material, a liquid, and at least one additive capable of causing volumetric expansion during formation of said mixture, comprising:
   (a) forming a mixture of said material, said liquid, and said at least one additive capable of causing volumetric expansion of the resulting mixture during its formation;
   (b) continuously or intermittently measuring the speed and the absolute value of the resulting volumetric changes being undergone by the mixture during its formation; and
   (c) controlling the addition of the quantities of said liquid and said at least one additive to the mixture as a function of the measurements made in step (b) and of previously established predetermined data until a mixture having the desired characteristics for its intended use is obtained.

2. A method for controlling the properties of a mixture of foundry sand, a liquid, and at least one additive capable of causing volumetric expansion during the formation of said mixture, comprising:
   (a) forming a mixture of foundry sand, a liquid, and at least one additive capable of causing volumetric expansion of the resulting mixture during its formation;
   (b) continuously or intermittently measuring the speed and the absolute value of the resulting volumetric changes being undergone by the mixture during its formation; and
   (c) controlling the addition of the quantities of said liquid and said at least one additive to the mixture as a function of the measurements made in step (b) and of previously established predetermined data, until a foundry sand mixture is obtained which is suitable for processing in a molding machine.

3. A method according to claim 2, wherein the addition of said liquid and of said at least one additive in step (c) is performed in separate stages, the nature and the quantities added during the subsequent stages being determined as a function of measurements made during preceding stages.

4. A method according to claim 2, wherein the predetermined data employed in step (c) are recorded and form part of a logistical programming system for controlling the addition of the liquid and of said at least one additive as a function of the measurements made.

5. A method according to claim 2, wherein the volume change measurements of step (b) are performed in a closed vessel of known base by measuring the changes in level of mixture in said vessel.

6. The method according to claim 2, wherein the liquid is water.

7. The method according to claim 2, wherein the additive is bentonite.

8. The method according to claim 2, wherein the additive is carbon.

9. The method according to claim 2, wherein the additives are bentonite and carbon.

10. The method according to claim 2, wherein the foundry sand mixture obtained in step (c) has a specific gravity ranging between 0.75 and 0.85.

11. A device for carrying out the method of claim 1 comprising a vat for receiving said material, means for feeding the liquid into the vat, means for feeding said at least one additive into the vat, means for mixing said material, liquid, and said at least one additive in the vat to cause a volumetric expansion of the resulting mixture, means for measuring the level of the mixture in the vat before and during the volumetric expansion of the mixture, and an electrical device, connected to said level measuring means, for controlling the flow rate of said liquid and said at least one additive into the vat.

12. The device of claim 11, wherein the material is foundry sand.

13. A device according to claim 12 wherein the level measuring device is selected from the group consisting of a mechanical, electrical and radiation probe.

* * * * *